United States Patent [19]

Ray

[11] 4,270,748

[45] * Jun. 2, 1981

[54] MODULARIZED SLIDE

[75] Inventor: Sunnie Ray, Litchfield, Mich.

[73] Assignee: Game Time, Inc., Fort Payne, Ala.

[*] Notice: The portion of the term of this patent subsequent to Jul. 8, 1997, has been disclaimed.

[21] Appl. No.: 152,068

[22] Filed: May 21, 1980

Related U.S. Application Data

[63] Continuation of Ser. No. 932,703, Aug. 11, 1978, Pat. No. 4,211,400.

[51] Int. Cl.³ .................................................. A63G 21/02
[52] U.S. Cl. ................................ 272/56.5 R; 104/69; 193/2 A; 403/337; 405/121
[58] Field of Search ................. 272/56.5 R, 56.5 SS; 104/59, 69, 70, 72, 73, 134; 193/2 R, 2 A, 25 E; 182/48; 52/11, 12, 13, 14, 15, 16, 584, 726; 405/119, 121, 126; 138/106, 107; 403/363, 337; 46/1 K, 43

[56] References Cited

U.S. PATENT DOCUMENTS

| | | | |
|---|---|---|---|
| 688,595 | 12/1901 | Coe | 52/11 |
| 1,648,196 | 11/1927 | Rohmer | 272/56.5 R X |
| 1,852,384 | 4/1932 | Wallin | 104/69 |
| 2,841,396 | 7/1958 | Foss | 272/56.5 R |
| 3,490,765 | 1/1970 | Moulton | 272/56.5 R |
| 3,796,429 | 3/1974 | Johnston | 272/56.5 R |
| 4,149,710 | 4/1979 | Rolichard | 104/70 X |

FOREIGN PATENT DOCUMENTS

| | | | |
|---|---|---|---|
| 224619 | 7/1910 | Fed. Rep. of Germany | 193/2 A |
| 6041 | 5/1921 | Netherlands | 405/121 |
| 337805 | 11/1930 | United Kingdom | 104/73 |

Primary Examiner—Richard C. Pinkham
Assistant Examiner—Arnold W. Kramer
Attorney, Agent, or Firm—Blanchard, Flynn, Thiel, Boutell & Tanis

[57] ABSTRACT

A playground slide for use on an incline, such as a hillside, comprising a plurality of modular bedway sections, each comprising a bedway floor and laterally spaced upstanding sidewalls two or more of which sections have diverse longitudinal curvatures, and universal connections on each section. These universal connections consist of a pair of flanges defined by an integral, longitudinal extension of the sidewalls beyond the terminal ends of the bedway floor for overlapping relation between adjacent sections which are fastened through aligned holes in the overlapping flanges thus permitting interconnection with other sections of similar or dissimilar longitudinal curvature, such that both the length and overall longitudinal curvature of said slide may be adapted to conform closely to the particular characteristics of the incline, based on the quantity, longitudinal curvature, and positional order of bedway sections utilized. The upper rounded edges of the sidewalls can either abut or be telescoped by swagging one end.

9 Claims, 8 Drawing Figures

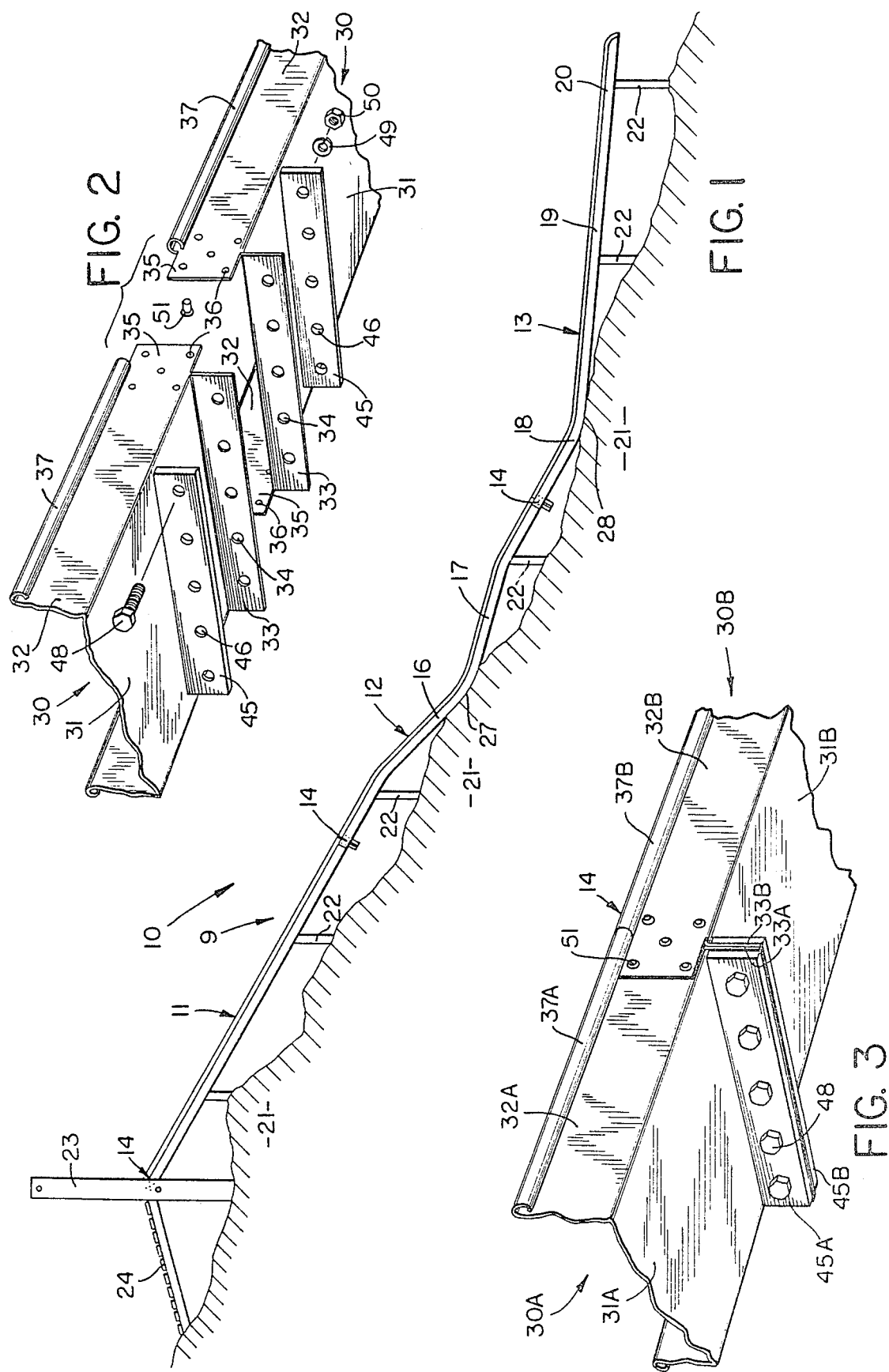

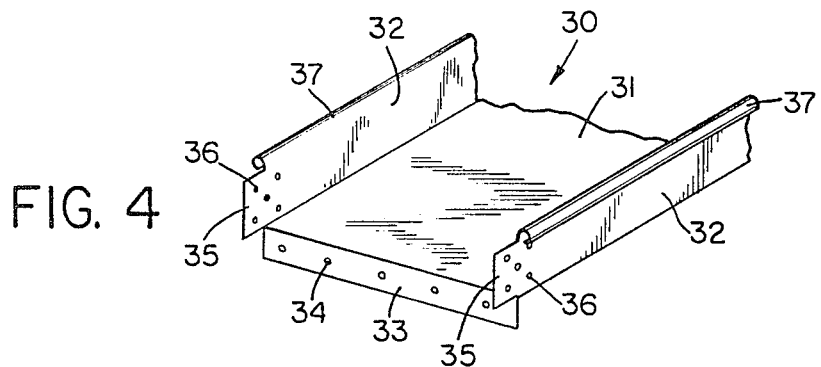
FIG. 4
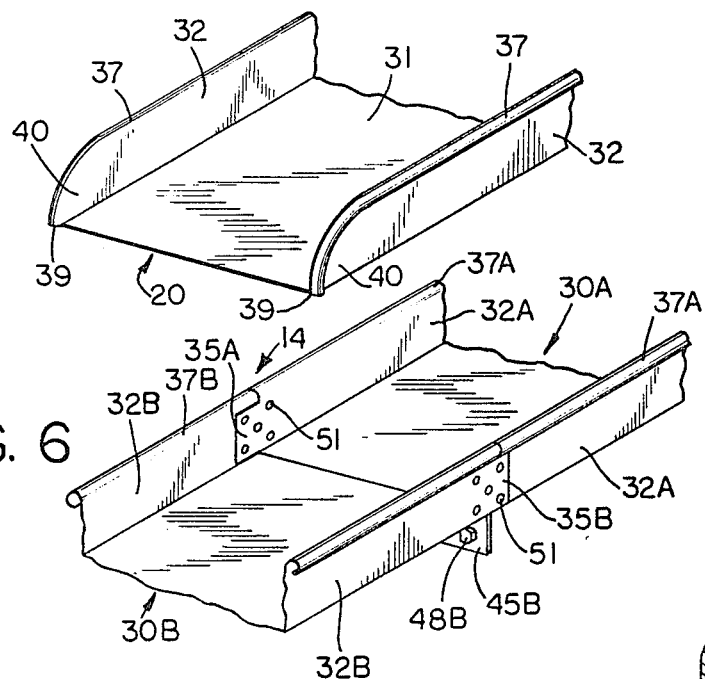
FIG. 5
FIG. 6
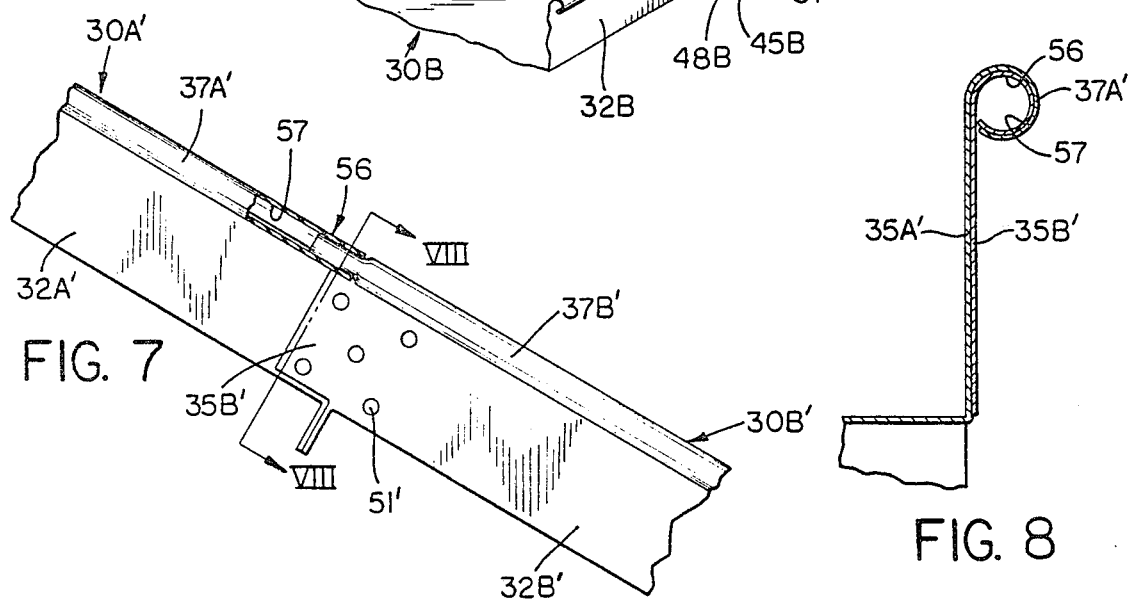
FIG. 7
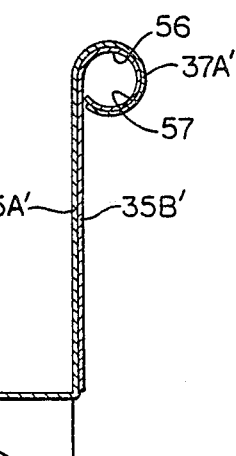
FIG. 8

MODULARIZED SLIDE

This is a continuation, of application Ser. No. 932,703, filed Aug. 11, 1978, and now U.S. Pat. No. 4,211,400.

FIELD OF THE INVENTION

The present invention relates to recreational equipment, and in particular, to playground slides wherein the bedway comprises a plurality of interconnectable modular sections.

BACKGROUND OF THE INVENTION

The concept of a modular slide is known. In particular, U.S. Pat. Nos. 790,631 and 1,239,848 each illustrate a slide comprising two separate bedway sections, facilitating shipment and storing of the slides, and U.S. Pat. Nos. 3,556,552 and 3,796,429 each illustrate a slide having a bedway comprising a plurality of identical bedway sections. These patents do not, however, disclose a slide having a plurality of universally interconnectable bedway sections, two or more of which have different longitudinal curvatures, and by means of which the overall length and curvature of the entire slide may be varied extensively. Further, these patents disclose structure for interconnecting the sections that requires the bolting of or riveting of external brackets or hinges to the bedway, and rely on an external frame or similar support structure to effect the interconnection or give it rigidity.

Longer playground slides are frequently more popular with children, but the starting portions are invariably very high off the ground with the added result of increasing the risk of injury from accidental falls.

The concept of a slide located on an incline, such as a hillside, permits a longer, more exciting slide, yet simultaneously reduces the risk of injury, since at all points the slide is in close proximity to the ground. In addition, the slide may be manufactured at a lower cost, since the conventional functions of ladder and support structure are substantially fulfilled by the hillside itself.

If, however, the slide is built as a single bedway section with a fixed longitudinal curvature, then the hillside must be adapted to fit the slide, often necessitating extensive and expensive bulldozing of earth, coupled with the attendant impact on the immediate environment. On the other hand, a specialized forming of a very long and integral bedway is too expensive to manufacture and is extremely difficult to transport and place into the desired position without damage thereto.

Accordingly, the objects of the present invention include:

1. To provide a playground slide for use on an incline, such as a hillside, whereby the close proximity of the slide to the incline permits implementation of a longer slide without added height and the attendant risk of injurious falls inherent in conventional slides, and permits the reduction in costs associated with the elimination of ladders and extensive support structures.

2. To provide a playground slide, as aforesaid, comprising a plurality of modular bedway sections, two or more of which have diverse longitudinal curvatures, such that both the length and overall curvature of said slide may be adapted to conform closely to the particular characteristics of said incline, based on the quantity, longitudinal curvature, and positional order of bedway sections utilized.

3. To provide a playground slide, as aforesaid, wherein each of said bedway sections is provided with universal connection means by which it may be interconnected to other bedway sections of similar or dissimilar longitudinal curvature, and wherein said connection means are simple and inexpensive, present no protrusions, sharp edges, or similar hazards to users of the slide, and provide a rigid and durable connection without the use of frames or support structures, or the attachment of external brackets or hinges.

SUMMARY OF THE INVENTION

The objects and purposes are met by providing a playground slide having a plurality of bedway sections and an exit section, each having an upwardly facing and smooth bedway floor and laterally spaced sidewalls each having smooth inwardly facing surfaces and a rounded upper edge. Modularized connecting means are provided for connecting the plurality of bedway sections into an end-to-end relation and the exit section to the lowermost one of the bedway sections along the length of the playground slide. The connecting means each include integral flange means at the opposite longitudinal ends of each of the bedway sections which are identical to each other to facilitate the interchanging of the end-to-end order of the bedway sections as desired. Fastening means are provided for connecting the modularized connecting means together and support means are provided for supporting the bedway sections in close proximity to the ground contour and in close parallelism thereto.

Other objects and purposes of this invention will be apparent to persons acquainted with apparatus of this general type upon reading the following specification and inspecting the accompanying drawings.

BRIEF DESCRIPTION OF THE DRAWINGS

FIG. 1 is a side elevational view of one embodiment of a modularized playground slide incorporating the present invention;

FIG. 2 is an exploded view of two sections of slide bedway, illustrating the interconnection thereof;

FIG. 3 is a perspective view from below of two interconnected sections of bedway;

FIG. 4 is a perspective view of an end of a single section of bedway and the provisions thereon for interconnection to other sections;

FIG. 5 is a perspective view of the end of a bedway section used to exit the slide;

FIG. 6 is a perspective view similar to FIG. 3 but from above of two interconnected sections of bedway;

FIG. 7 is a side view of a modified joint between two slide sections; and

FIG. 8 is a sectional view taken along the line VIII—VIII of FIG. 7.

DETAILED DESCRIPTION

FIG. 1 is an illustration of one embodiment of a modular slide, designated generally by reference numeral 10, embodying the present invention. The modular slide 10 has a slide bedway 9 which comprises a plurality of modular bedway sections, in this case a straight section 11, a wave section 12, and an exit section 13, secured to each other in an end-to-end relationship by interconnection means 14. The sections 11, 12 and 13 differ primarily in longitudinal curvature, and in that no interconnection means 14 are provided at the end of the exit section 13 defining a slide exit 20. The longitudinal path of the section 11 is substantially a straight line. The wave section 12 has, near its longitudinal midpoint, a downward curve 16 followed by an upward curve 17. The longitudinal path of the exit section 13 comprises a curve 18 followed by a substantially horizontal deceleration segment 19, terminating in the slide exit 20.

The slide 10 is positioned on an incline 21, such as a hillside and, through an appropriate selection and interconnection of modular sections 11, 12 and 13, is provided with an overall longitudinal curvature substantially the same as that of the incline 21. The slide bedway 9 is mounted on an entry support 23 and a plurality of bedway supports 22, and may in some cases be supported directly by the incline 21 at one or more locations, as at 27 and 28. The bedway supports 22 are connected to the underside of the bedway sections at locations spaced from the interconnection means 14. Although entry to the slide 10 may be achieved directly from the incline 21, in some cases entry may be facilitated by the addition of an entry ramp 24, or similar device, extending from the incline 21 to the entry support 23. The interconnection means 14 for connecting the bedway section 11, for example, to the entry support is identical to the interconnection means between each of the bedway sections.

FIG. 4 illustrates one end of one of the sections of the bedway 9, designated generally by reference numeral 30. The bedway 30 comprises a bedway floor 31, which functions as a sliding surface, and sidewalls 32 which are integral with the floor and extend upwardly from the lateral edges of the bedway floor 31, substantially perpendicular thereto. The end of the bedway floor 31 is bent downwardly at substantially a right angle to form a bottom flange 33. A plurality of holes 34 are provided in the bottom flange 33 and are preferably positioned symmetrically about a vertical plane that longitudinally bisects the bedway 30. The sidewalls 32 each extend longitudinally a short distance beyond the end of the bedway floor 31, forming side flanges 35. A plurality of holes 36 in a predetermined pattern are provided in the end of each sidewall 32 and the adjacent flange 35, preferably positioned symmetrically about a vertical plane containing the surface of the bottom flange 33, and such that the flanges 35 and the mutually adjacent portion of the sidewalls 32 are mirror images of each other. A tubular-shaped bedrail 37 and having a length equal to that of the bedway floor 31, is integrally formed along the top edge of each sidewall 32, such that the ends of said bedrail 37 are aligned longitudinally with the ends of the bedway floor 31.

Both ends of each modular bedway section 11, 12 and 13 are provided with the configuration just described in connection with FIG. 4, with the exception of the exit section 13, which has this configuration at one end only. FIG. 5 illustrates the other end, namely, the slide exit 20 of the exit section 13, wherein the height of each sidewall 32 decreases near the end of the bedway, as at 40, becoming non-existent at a point coincident with the end of the bedway floor 31, as at 39. As shown in FIG. 5, the bedrails 37 of the exit section 13 are integrally formed along the tops of the sidewalls 32 throughout the decrease in sidewall height, and terminate with the sidewall 32 at the bedway floor 31, as at 39.

For purposes of further discussion and specific reference to FIGS. 3 and 6 only, the portions of the uphill section will be referred to with the same reference numerals used heretofore except that the suffic "A" has been added thereto and, for the downhill section, the suffix "B" has been added thereto. The interconnection of two arbitrary bedway sections to form the interconnection means 14 is achieved by positioning them in an end-to-end relationship, as shown in FIG. 2, and sliding them together longitudinally until the surfaces of the respective bottom flanges 33A, 33B and the ends of the respective bedrails 37A, 37B, butt against each other, as shown in FIGS. 3 and 6. As shown in FIG. 6, both side flanges 35A of the uphill bedway 30A are placed to the inside of the side flanges 35B of the downhill bedway 30B, to minimize protruding edges and facilitate the safe and efficient movement of the person sliding past the interconnection means 14. The flanges 35A and 35B of the bedways 30A, 30B are then secured to each other by means of smooth headed rivets 51 located in the holes 36. The abutting bottom flanges 33A, 33B are sandwiched between a pair of backing plates 45A, 45B (FIG. 2), each of said backing plates 45A, 45B having substantially the same length and width as each of the bottom flanges 33A, 33B and having holes 46 positioned so as to be aligned with the holes 34A, 34B in the corresponding bottom flanges 33A, 33B when the backing plates 45A, 45B are positioned against the bottom flanges 33A, 33B. The backing plates 45A, 45B and bottom flanges 33A, 33B are secured by a plurality of lock washers 49, nuts 50, and bolts 48 inserted in said aligned holes 46A, 46B and 34A, 34B. In this embodiment, the bedrails 37 are axially aligned and are in end-to-end abutment.

ALTERNATE CONSTRUCTION

FIGS. 7 and 8 illustrate an alternate construction. For purposes of further discussion and with specific reference to FIGS. 7 and 8, the portions of the bedway sections will be referred to with the same reference numerals used heretofore in the description of FIGS. 3 and 6, except that in addition to the suffixes "A" and "B", the additional prime (') suffix will be utilized.

The bedrail 37B' of the downhill bedway 30B' is modified so that the uphill end 56 thereof is swagged to a smaller diameter than the majority thereof extending along the length of the bedway 30B'. In addition, the uphill end 56 extends uphill beyond the terminal end of the flange 35B'. In this particular embodiment, the terminal end of the flange 35B' is located at about the midpoint of the length of the swagged end 56. The diameter of the swagged end 56 is slightly less than the internal diameter of the hollow portion of the bedrail 37A'. Thus, when the flange 37B' is placed alongside the flange 35A' of the uphill section, the swagged end 56 will be telescoped into the opening 57 in the bedrail 37A'. Rivets or the like 51' are received in the aligned opening in the flanges 35A' and 35B' to secure the sides 32A' and 32B' of the bedway sections together. This construction assures a more true alignment between the bedrails 37A' and 37B' and further minimizes the likelihood that the bedrails will become shifted out of alignment, thereby presenting an edge on which clothing can be snagged and torn.

Thus my invention circumvents the problems heretofore encountered by providing a series of modular bedway sections with diverse longitudinal curvatures, whereby the overall length and curvature of the slide can be adapted to the particular characteristics of the hillside, based on the quantity, longitudinal curvature, and positional order of the sections utilized.

In addition, my invention provides a unique connection means to permit connection of any bedway section to any other bedway section, whether of a similar or dissimilar longitudinal curvature, wherein the connection means are substantially a part of the bedways, requiring no external brackets nor similar devices to be riveted or otherwise attached to the bedways, and yield a simple and inexpensive, yet rigid and durable connection that is not dependent on an external frame or similar support structure to effect the connection or to provide rigidity.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A playground slide, comprising:
   a plurality of bedway sections and an exit section each having an upwardly facing bedway floor and laterally spaced side walls each having inwardly facing surfaces and a rounded upper edge;
   modularized connecting means for connecting said plurality of bedway sections into an end-to-end relation and said exit section to the lowermost one of said bedway sections along the length of said playground slide, said connecting means each including integral flange means at the opposite longitudinal ends of each of said bedway sections which are identical to each other to facilitate the interchanging of said end-to-end order of said bedway sections, said flange means including a pair of first flanges defined by an integral longitudinal extension of said sidewalls beyond the opposite terminal ends of said bedway section and a second flange integral with said bedway floor and extending transversely downwardly from said bedway floor on a side thereof remote from said smooth surface, said second flange being located at said opposite terminal ends, said rounded upper edges terminating adjacent said terminal ends, said end-to-end relation comprising the placement of said second flanges and the terminal ends of said rounded edges on the mutually adjacent ends of a pair of bedway sections into abutting relation and said first flanges thereof into side-by-side overlapping relation, the innermost one of said first flanges being integral with the uppermost one of said bedway sections along the length of said playground slide and fastening means for fastening said first and second flanges together; and
   support means for supporting said bedway sections above the ground.

2. A playground slide according to claim 1, wherein said fastening means include means defining a plurality of axially aligned holes in said first and second flanges and a plurality of fasteners received in said holes to fasten said first and second flanges together.

3. A playground slide according to claim 2, wherein said fastening means includes means defining a plurality of first holes in said first flanges and first fasteners received in said first holes for fastening said first flanges together and a pair of backing plates each having means defining holes therein axially aligned with second holes in said second flanges, said pair of backing plates sandwiching said second flanges therebetween and second fasteners received in said second holes for clamping said second flanges between said pair of backing plates.

4. A playground slide according to claim 1, wherein said exit section has said modularized connecting means at one end thereof only and an exit portion at the opposite end thereof, said exit portion including a tapered sidewall portion to gradually bring said upper rounded edges into generally the same plane as said bedway floor thereof.

5. A playground slide according to claim 1, wherein the uppermost end of the uppermost one of said bedway sections along the length of said playground slide defines an entry section; and
   wherein said support means includes entry support means for supporting said entry section above the ground.

6. A playground slide according to claim 5, wherein said entry support means includes modularized connecting means thereon for connecting said entry section to said entry support means.

7. A playground slide according to claim 1, wherein said rounded upper edges include on an uphill end a swagged end of lesser diameter than the majority of the longitudinal length of the rounded upper edge, said swagged end being telescopingly received in the downhill end of the rounded upper edge in the next adjacent uphill bedway section to maintain the axial alignment of the upper rounded edges.

8. A playground slide, comprising:
   a plurality of bedway sections and an exit section each having an upwardly facing bedway floor and laterally spaced sidewalls each having inwardly facing surfaces and a rounded upper edge;
   modularized connecting means for connecting said plurality of bedway sections into an end-to-end relation and said exit section to the lowermost one of said bedway sections along the length of said playground slide, said connecting means each including integral flange means at the opposite longitudinal ends of each of said bedway sections which are identical to each other to facilitate the interchanging of said end-to-end order of said bedway sections, said flange means including at least a pair of flanges defined by an integral, longitudinal extension of said sidewalls beyond the opposite terminal ends of said bedway section, said end-to-end relation comprising the placement of said flanges into side-by-side overlapping relation, the innermost one of said flanges being integral with the uppermost one of said bedway sections along the length of said playground slide and fastening means defining a plurality of axially aligned holes in each of said side-by-side flanges and a plurality of fasteners received in said holes to fasten said flanges together, the portion of said fasteners on the inside of said bedway having a smooth contour along the inside wall of each of said flanges; and
   support means for supporting said bedway sections above the ground.

9. A playground slide according to claim 8, wherein said rounded upper edges include on an uphill end a swagged end of lesser diameter than the majority of the longitudinal length of the rounded upper edge, said swagged end being telescopingly received in the downhill end of the rounded upper edge in the next adjacent uphill bedway section to maintain the axial alignment of the upper rounded edges.

* * * * *